UNITED STATES PATENT OFFICE.

JOHN W. LAFER, OF CATAWBA ISLAND, OHIO.

WOOD-BLIGHT COMPOSITION.

939,273.      Specification of Letters Patent.      Patented Nov. 9, 1909.

No Drawing.      Application filed March 25, 1909. Serial No. 485,840.

*To all whom it may concern:*

Be it known that I, JOHN W. LAFER, a citizen of the United States, residing at Catawba Island, in the county of Ottawa and State of Ohio, have invented a certain new and useful Improvement in Wood-Blight Compositions, of which the following is a specification.

My composition is prepared by mixing the following ingredients, in the proportion stated, viz:

| Ingredient | Amount |
|---|---|
| Potassium hydroxid | 5 oz. |
| Sodium hydroxid | 17 oz. |
| Arsenious oxid | 20 oz. |
| Chlorid of iron, (ferric chlorid, preferred) | 1 oz. |
| Lime, unslaked | 3¾ lbs. |
| Sulfur, pulverized preferred | 6 lbs. |
| Cupric sulfate | 1½ lbs. |
| Water, substantially pure | 100 gallons. |

The aforesaid ingredients are thoroughly mingled by the means of the agitation hereinafter set forth, so that they will be fully acted upon by each other.

To ten ounces of water taken from the one hundred gallons add the five ounces of potassium hydroxid and apply heat: to the aforesaid add five ounces of sodium hydroxid dissolved by ten ounces of water taken from the remaining portion of the one hundred gallons and warmed, and thereafter agitate the same by applying heat to the extent of causing a slow boil: then add twenty ounces of arsenious oxid, substantially pure, and agitate all of the aforesaid preparation by boiling for ten minutes, and permit the same to cool slowly thereafter: a chemical reaction takes place from the aforesaid, wherefrom sodium arsenite and postassium arsenite is formed: to the aforesaid add one ounce of chlorid of iron solution, preferably ferric chlorid, so that by chemical reaction ferric arsenite will have been formed, and agitate the preceding preparation by stirring well for a few moments and thereafter permit the same to stand for a short time and then add the following preparation. Add sufficient warmed water taken from the remaining portion of the one hundred gallons to slake three and three quarter pounds of fresh unslaked stone lime, substantially pure, whereby will be obtained calcium hydroxid, and to this add six pounds of pulverized sulfur, agitating the same by thoroughly mixing, and from which will be obtained calcium disulfid to an approximated amount of one hundred and thirty nine ounces: to this latter preparation add twelve ounces of sodium hydroxid which previously has been dissolved by one quart of warmed water taken from the remaining portion of the one hundred gallons, and from the said reaction we will have sodium di-sulfid of an approximated amount of twenty five and sixty-five one-hundredths ounces, and all of which agitate by boiling for about three quarters of an hour, and in the mean time stir the same to keep it in a very plastic state and extract therefrom the liquid which add to the preparation which herein before was permitted to stand for a time: on adding the extracted liquid a chemical reaction takes place wherefrom is produced calcium arsenite to the approximate amount of two and nine-one-hundredths of an ounce, which is thoroughly mixed by agitation with the aforesaid ingredients: to this later preparation now add one and one-half pounds of cupric sulfate dissolved by a gallon of water well heated and taken from the remaining portion of the one hundred gallons, whereupon a chemical reaction takes place and the composition will contain approximately, thirty one one-hundredths ounce of ferric arsenite, two and eight one-hundredths ounces of calcium arsenite, thirty five and sixty-four one-hundredths ounces of cupric arsenite, a trace of sodium arsenite, twenty seven ounces of calcium sulfate, eleven and fifteen one-hundredths ounces of calcium hydroxid, four and five-tenths ounces of sodium hydroxid, four and twenty six one-hundredths ounces of potassium hydroxid, ninety seven one-hundredths ounces of cupris hydroxid, twenty five and sixty five one hundredths ounces of sodium di-sulfid, and thirty one and sixteen one hundredths ounces of calcium di-sulfid: While the aforesaid chemical reactions are taking place the remaining portion of the one hundred gallons of water is added and intermingled.

The aforesaid composition is placed about the roots of plants, shrubs and trees, and is absorbed, whereupon it innoculates and circulates with the sap to the portions which may be effected with wood blight and thereupon causes the same to disappear and be exterminated: the utility of above composition is dependent on plenty of moisture about the roots which should be bared for its application, whereupon healthy plant life will be regained.

I am not aware that any similar composition has ever heretofore been used for any purposes whatever.

What I claim, and desire to secure by Letters Patent of the United States, is—

A wood blight composition, comprising ferric arsenite, calcium arsenite, cupric arsenite, sodium arsenite, calcium sulfate, calcium hydroxid, sodium hydroxid, potassium hydroxid, cupric hydroxid, sodium di-sulfid, calcium di-sulfid and water, in the described proportions.

In testimony whereof I affix my signature in presence of two witnesses.

JOHN W. LAFER.

Witnesses:
H. E. CUNNINGHAM,
LEE R. DRAKE.